United States Patent
Usui (10) Patent No.: US 8,395,912 B2
(45) Date of Patent: Mar. 12, 2013

(54) RESONANT SWITCHING POWER SUPPLY DEVICE WHICH SUPPRESSES A SWITCHING FREQUENCY RAISED AT THE TIME OF LIGHT LOAD

(75) Inventor: Hiroshi Usui, Niiza (JP)

(73) Assignee: Sanken Electric Co., Ltd., Saitama (JP)

(*) Notice: Subject to any disclaimer, the term of this patent is extended or adjusted under 35 U.S.C. 154(b) by 0 days.

(21) Appl. No.: 12/861,887

(22) Filed: Aug. 24, 2010

(65) Prior Publication Data

US 2011/0051465 A1 Mar. 3, 2011

(30) Foreign Application Priority Data

Aug. 26, 2009 (JP) ................................. 2009-194909

(51) Int. Cl.
*H02M 3/335* (2006.01)
(52) U.S. Cl. .................................................. 363/21.02
(58) Field of Classification Search ..... 363/21.02–21.04, 363/21.12, 21.08, 21.16
See application file for complete search history.

(56) References Cited

U.S. PATENT DOCUMENTS

| | | | | |
|---|---|---|---|---|
| 4,027,269 A | * | 5/1977 | Campbell | 330/267 |
| 5,073,849 A | * | 12/1991 | Morris | 363/21.03 |
| 6,259,610 B1 | * | 7/2001 | Karl et al. | 363/21.09 |
| 7,215,517 B2 | * | 5/2007 | Takamatsu | 361/18 |
| 2006/0170288 A1 | * | 8/2006 | Usui | 307/17 |

FOREIGN PATENT DOCUMENTS

JP 2009-100631 A 5/2009

* cited by examiner

*Primary Examiner* — Adolf Berhane
*Assistant Examiner* — Jeffrey Gblende
(74) *Attorney, Agent, or Firm* — Birch, Stewart, Kolasch & Birch, LLP (57) ABSTRACT

The resonant switching power supply device is equipped with switching elements QH and QL connected in series to an input direct-current power source Vin, a transformer T1 having secondary windings S1 and S2 and a primary winding P1, a resonant circuit where the primary winding P1 and a current resonant capacitor Cri are connected in series and which is connected in parallel to any one of the switching elements, and a rectifying circuit (D1+D2+Co) connected to the secondary winding to obtain an output voltage Vo; the transformer T1 is equipped with a primary winding P2 closely coupled to the primary winding P1, one terminal of the primary winding P2 is connected to one or the other terminal of the primary winding P1. By the other terminal is an open circuit at any time, it suppresses the switching frequency raised at the time of light load.

17 Claims, 7 Drawing Sheets

(a) Vin=300V
When 100% Load
Switching frequency =43.1kHz (b) Vin=450V
When 100% Load
Switching frequency =74.6kHz (c) Vin=300V
When 0.01% Load
Switching frequency =87.7kHz (d) Vin=450V
When 0.01% Load
Switching frequency =139.4kHz

(a) Vin=300V
When 100% Load
Switching frequency =43.1kHz

(b) Vin=450V
When 100% Load
Switching frequency =74.6kHz (c) Vin=300V
When 0.01% Load
Switching frequency =47.1kHz (d) Vin=450V
When 0.01% Load
Switching frequency =83.3kHz

RESONANT SWITCHING POWER SUPPLY DEVICE WHICH SUPPRESSES A SWITCHING FREQUENCY RAISED AT THE TIME OF LIGHT LOAD

BACKGROUND OF THE INVENTION

1. Field of the Invention

The present invention relates to a resonant switching power supply device and particularly to a resonant switching power supply device able to reduce an increase in switching frequency when a load is light.

2. Description of the Related Art

As a DC-DC converter, a resonant switching power supply device has been used. The resonant switching power supply device is equipped with: high-side and low-side switching elements that are connected in series between the cathode and anode of an input direct-current power source; and a resonant circuit that is connected in parallel to one of the switching elements and consists of a primary winding of a transformer and a current resonant capacitor. A resonant current flows through a primary-side inductance element of the transformer and the current resonant capacitor as the switching elements are turned on and off. At this time, the voltage obtained at a second winding of the transformer is rectified. A direct-current voltage is therefore obtained at the output side.

The resonant switching power supply device can adopt a control method called PFM (Pulse Frequency Modulation) control to control an output voltage by changing the switching frequency. When a higher frequency range than a resonant frequency is used as the switching frequency of the PFM control, the switching frequency is raised with the lower output voltage and the switching frequency is lowered with the higher output voltage. In this case, the output voltage is fed back and the switching frequency of the switching elements is automatically controlled so that an output direct-current voltage gets stabilized.

In the resonant switching power supply device, there is the following phenomenon: an oscillating voltage is superimposed on a secondary-side voltage due to the effects of a stray capacitance of the transformer and a leakage inductance when a load is light, an output smoothing capacitor is charged to the peak due to the oscillating voltage, and the output voltage rises as a result. In the resonant switching power supply device, the output voltage is fed back and the switching frequency is PFM-controlled so that the output voltage gets stabilized. The problem is that when the output voltage rises after the output smoothing capacitor is charged to the peak due to the oscillating voltage as described above, the switching frequency then rises in a way that reduces the increase of the output voltage.

To solve the above problem, for example, what is disclosed in Jpn. Pat. Appln. Laid-Open Publication No. 2009-100631 (Patent Document 1) is a technique of providing a capacitor in parallel to a current resonant reactor connected in series to the primary winding of the transformer to prevent the increase of the switching frequency when the load is light. The technique of Patent Document 1 is aimed at leading a charge current of the stray capacitance to the parallel-connected capacitor by bypassing the current resonant reactor to prevent unnecessary boosting energy from being stored in the current resonant reactor and keeping the switching frequency from rising when the load is light.

CITATION LIST

[Patent Document]
[Patent Document 1] Jpn. Pat. Appln. Laid-Open Publication No. 2009-100631

According to the conventional technique disclosed in the above Patent Document 1, it is possible to prevent the increase of the switching frequency when the load is light. However, according to the conventional technique disclosed in the above Patent Document 1, it is necessary for the capacitor to be connected to the current resonant reactor acting as an individual component. Therefore, the current resonant reactor and the transformer need to be separate as individual components.

In order to make the resonant switching power supply device smaller as a DC-DC converter, it is advantageous to decrease the number of components. The above type of conventional current resonant DC-DC converter requires a current resonant reactor. Therefore, also with the aim of reducing costs, the primary and secondary windings of the transformer have been provided as divided windings so that the transformer acts as a leakage transformer; the leakage inductance of the leakage transformer has been used as a current resonant reactor. That is, besides the transformer, there is no any other individual component that acts as a current resonant reactor. However, according to the technique disclosed in the above Patent Document 1, another individual component that acts as a current resonant reactor is necessary besides the transformer, leading to an increase in the number of components.

The following provides a more detailed description of the problem about the increase in switching frequency when the load is light as described above.

Figure 5:
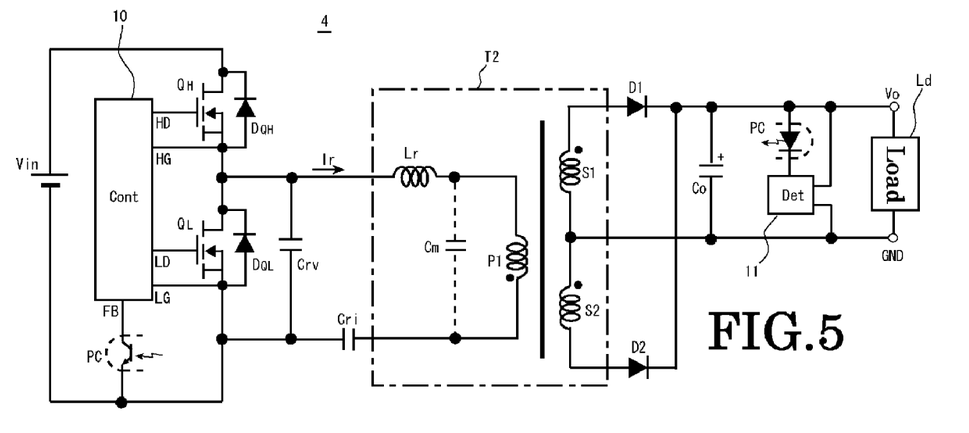
FIG. 5 is a circuit configuration diagram of a resonant switching power supply device according to a conventional technique.

FIG. 5 shows a resonant switching power supply device 4 according to a conventional technique. The following describes the circuit configuration and operation of the resonant switching power supply device 4 shown in FIG. 5.

In the resonant switching power supply device 4 shown in FIG. 5, the reference symbol Vin represents an input direct-current power source, Cri a current resonant capacitor, Co a smoothing capacitor, Crv a voltage resonant capacitor, QH a high-side switching element that is a N-channel MOSFET, QL a low-side switching element that is a N-channel MOSFET, DQH, DQL, D1 and D2 diodes, Lr a reactor, T2 a transformer, P1 a primary winding of the transformer T2, S1 and S2 secondary windings of the transformer T2, and Ld a load. As for the reference symbol Cm, the stray capacitances between the primary winding P1 and secondary windings S1 and S2 of the transformer T2, the electrodes of the diodes D1 and D2 and other parts are converted into the primary side of the transformer T2 and represented as one capacitor Cm. The reference numeral 11 denotes a voltage detector that detects an output voltage. The reference symbol PC represents a photocoupler that feeds signals that are proportional to the output voltage detected by the voltage detector 11 back to the primary side. The reference numeral 10 represents a control circuit that brings the output voltage to a predetermined value on the basis of the feedback signals associated with the output voltage that are input to an input terminal FB through the photocoupler PC.

The resonant switching power supply device 4 has the configuration of a half bridge circuit. The drain terminal of the switching element QH is connected to the positive terminal of the input direct-current power source Vin. The source terminal of the switching element QL is connected to the negative terminal of the input direct-current power source Vin. The source terminal of the switching element QH is connected to the drain terminal of the switching element QL.

The diode DQH is connected between the drain and source of the switching element QH, and the diode DQL between the drain and source of the switching element QL. The diodes DQH and DQL are diodes built into the switching elements QH and QL or external diodes connected to the switching elements QH and QL. The diodes DQH and DQL are connected in the direction opposite to the flow of current through the switching elements QH and QL (anti-parallel connection).

The voltage resonant capacitor Crv is connected in parallel to the drain terminal and source terminal of the switching element QL; a series circuit in which the reactor Lr, the primary winding P1 and the current resonant capacitor Cri are connected in series is connected in parallel. The reactor Lr is a reactor connected in series to the primary winding P1 of the transformer T2 or a reactor realized by the primary leakage inductance of the transformer T2. The use of a leakage transformer as the transformer T2 is preferable because the primary leakage inductance can be used as the reactor Lr. If the leakage transformer is used, it is not necessary for the reactor Lr to be connected in series to the primary winding P1. However, when the reactor Lr is connected in series to the primary winding P1, the sum of the primary leakage inductance of the transformer T2 and the value of the inductance of the reactor Lr is regarded as the reactor Lr.

The polarity of the voltage that occurs at each of the windings P1, S1 and S2 of the transformer T2 is indicated by dot (•). The anode terminal of the diode D1 is connected to one terminal (at the •-side) of the secondary winding 51 of the transformer T2. The cathode terminal of the diode D1 is connected to one terminal (positive-side terminal) of the smoothing capacitor Co, the cathode terminal of the diode D2 and the output terminal Vo. The other terminal of the secondary winding 51 of the transformer T2 and one terminal (at the •-side) of the secondary winding S2 of the transformer T2 are connected in series; the connection point is connected to the other terminal (negative-side terminal) of the smoothing capacitor Co and a GND terminal. The other terminal of the secondary winding S2 of the transfer T2 is connected to the anode of the diode D2. The cathode terminal of the diode D2 is connected to a connection point where one terminal (positive-side terminal) of the smoothing capacitor Co, the cathode terminal of the diode D1 and the output terminal Vo are connected together. The load Ld is connected to both ends of the smoothing capacitor Co.

The feedback signals of the output voltage are input to the input terminal FB of the control circuit 10. The control circuit 10 supplies gate signals to the gate terminal of the switching element QL through terminals LD and LG on the basis of the feedback signals as well as to the gate terminal of the switching element QH through terminals HD and HG.

The control circuit 10 performs a PFM control process by alternately turning the switching elements QL and QH on and off on the basis of the feedback signals, setting the on-duty of the switching elements QL and QH at about 50%, and changing the frequency of the switching elements QL and QH so that the output voltage Vo becomes constant. Incidentally, there is dead time to prevent both the switching elements QL and QH from being turned on at the same time.

Figure 6:
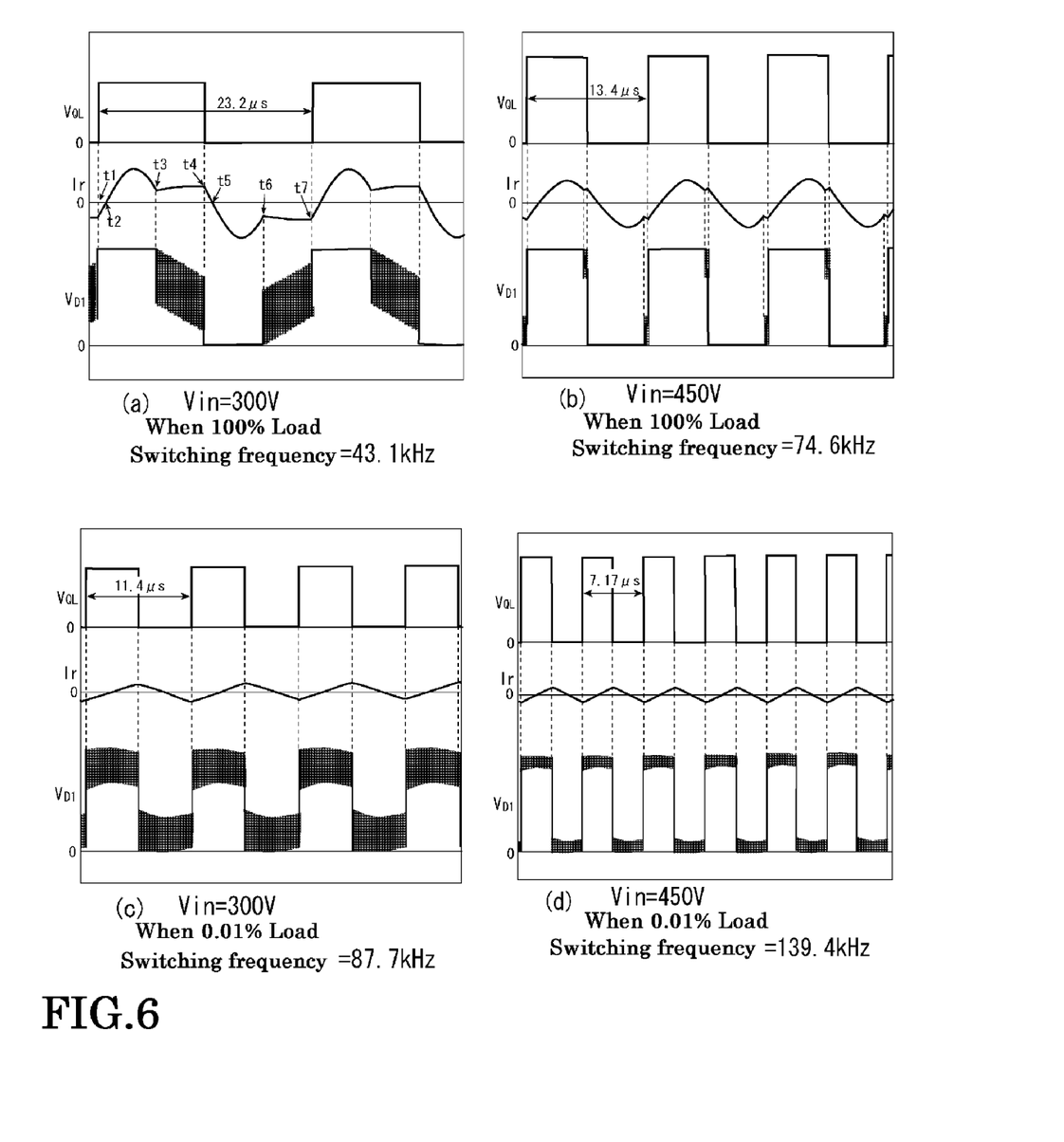
FIGS. 6A to 6D are operational sequence diagrams of the resonant switching power supply device shown in FIG. 5 according to the conventional technique.

The following describes the operation of the resonant switching power supply device 4 having the above configuration. FIG. 6 shows operational waveforms of the voltage VQL between the drain and source terminals of the low-side switching element QL, the current Ir indicated by Ir in FIG. 5 that flows through the reactor Lr, and the voltage VD1 of the diode D1. The operational waveforms of other parts are not shown in the diagram.

First, the waveform of FIG. 6A will be described. In this case, the input power source voltage Vin is set at 300 V, the load is a rated load (100% Load), and the switching frequency is set at 43.1 kHz (with a period of 23.2 μs).
(Time t1 to t2)

After the switching element QL is switched off at time t1, a voltage quasi-resonance occurs due to the energy of excitation current stored in the transformer T2. The voltage quasi-resonance is due to the sum (indicated by Lr+Lp, hereinafter) of the reactor Lr and the excitation inductance Lp, the current resonant capacitor Cri and the voltage resonant capacitor Crv. However, the resonant voltage caused by the voltage resonant capacitor Crv whose capacitance is small is observed as the voltages across the switching elements QL and QH. That is, the current of the switching element QL moves to the voltage resonant capacitor Crv as the switching element QL is turned off; when the voltage resonant capacitor Crv is charged to the voltage of the input direct-current power source Vin, the current returns to the input power source voltage Vin through the built-in diode DQH of the switching element QH. Meanwhile, the switching element QH is turned on, making the zero-voltage switching of the switching element QH possible.
(Time t2 to t3)

Since the switching element QH is on at time t2, a current flows through the following path: the positive terminal of the input direct-current power source Vin→the switching element QH→the reactor Lr→the primary winding P1 of the transformer T2→the current resonant capacitor Cri→the negative terminal of the input direct-current power source Vin. The current is a combination of an excitation current flowing through an excitation inductance Lp of the transformer T2 (not shown) and a load current that is supplied from the output terminal Vo and GND terminal to the load after flowing through the following path: the primary winding P1 of the transformer T2→the secondary winding S2 of the transformer T2→the diode D2→the smoothing capacitor Co. That is, since the former turns out to be a sine-wave resonant current of the Lr+Lp and current resonant capacitor Cri and has a lower resonant frequency than that in a period during which the switching element QH is on, a portion of the sine wave is observed as a triangular-wave current. The latter turns out to be a sine-wave resonant current having resonant components of the reactor Lr and current resonant capacitor Cri and reaches 0 A at time t3.
(Time t3 to t4)

At time t3, the sine-wave resonant current having the resonant components of the reactor Lr and current resonant capacitor Cri reaches 0 A. During the period t3 to t4, there is only the sine-wave resonant current of the Lr+Lp and current resonant capacitor Cri.
(Time t4 to t5)

After the switching element QH is turned off at time t4, a voltage quasi-resonance occurs due to the energy of excitation current stored in the transformer T2. The voltage quasi-resonance is due to the Lr+Lp, the current resonant capacitor Cri and the voltage resonant capacitor Crv. However, the resonant voltage caused by the voltage resonant capacitor Crv whose capacitance is small is observed as the voltages across the switching elements QL and QH. That is, the current of the switching element QH moves to the voltage resonant capacitor Crv as the switching element QH is turned off; when the voltage resonant capacitor Crv is discharged to 0 V, the current resonant capacitor Cri is charged through the built-in diode DQL of the switching element QL. Meanwhile, the switching element QL is turned on, making the zero-voltage switching of the switching element QL possible.

(Time t5 to t6)

Since the switching element QL is on at time t5, the current resonant capacitor Cri acts as a power source and a current flows through the following path: the current resonant capacitor Cri→the primary winding of the transformer T2→the reactor Lr→the switching element QL→the current resonant capacitor Cri. The current is a combination of an excitation current flowing through the excitation inductance Lp of the transformer T2 and the load current that is supplied from the output terminal Vo and GND terminal to the load after flowing through the following path: the primary winding P1 of the transformer T2→the secondary winding S1 of the transformer T2→the diode D1→the smoothing capacitor Co. That is, since the former turns out to be a sine-wave resonant current of the Lr+Lp and current resonant capacitor Cri and has a lower resonant frequency than that in the period during which the switching element QL is on, a portion of the sine wave is observed as a triangular-wave current. The latter turns out to be a sine-wave resonant current having resonant components of the reactor Lr and current resonant capacitor Cri and reaches 0 A at time t6.

(Time t6 to t7)

At time t6, the sine-wave resonant current having the resonant components of the reactor Lr and current resonant capacitor Cri reaches 0 A at time t6. During the period t6 to t7, there is only the sine-wave resonant current of the Lr+Lp and current resonant capacitor Cri.

By the way, the actual DC-DC converter has many capacitances (stray capacitances) that are not shown in the circuit diagram of FIG. 5. In general, the capacitances do not have a great impact on the operation of the circuit of the DC-DC converter. However, in some cases, it is impossible to ignore the existence of the capacitances, which for example include the capacitance across the primary winding of the transformer T2, the capacitance across the secondary winding, the capacitance between the primary and secondary windings, and the capacitance between the electrodes of the output diodes D1 and D2. The above stray capacitances are integrated and converted into the capacitance across the primary winding of the transformer T2, Cm, which is indicated by dotted line in FIG. 5. When the stray capacitance Cm is relatively large, a charge current flows through the reactor Lr to charge the stray capacitance Cm while unnecessary boosting energy is stored in the reactor Lr. The energy causes an oscillating current and oscillating voltage due to the resonance of the reactor Lr and stray capacitance Cm, helping to increase the output voltage particularly when the load of the DC-DC converter is light.

During the period t1 to t3 and period t4 to t6, a load current flows through the transformer T2. During the above periods, a resistor that is connected in parallel to the stray capacitance Cm in terms of an equivalent circuit has a resistance value equivalent to that of a load resistance. Therefore, the load impedance of the resonant circuit of the reactor Lr and stray capacitance Cm becomes smaller when the rated load is used, making it difficult for an oscillating current and oscillating voltage to occur.

On the other hand, during the period t3 to t4 and period t6 to t7, only a sine-wave resonant current of the Lr+Lp and current resonant capacitor Cri, or excitation current, flows through the transformer T2. During the above periods, a load resistance that is connected in parallel to the stray capacitance Cm in terms of an equivalent circuit becomes infinite and the load impedance of the resonant circuit of the reactor Lr and stray capacitance Cm becomes larger, making it easy for an oscillating current and oscillating voltage to occur due to the resonance of the reactor Lr and stray capacitance Cm. In FIG. 6A, an oscillating voltage is observed on the voltage waveform VD1 of the diode D1 during the period t3 to t4 and period t6 to t7 because only the excitation current flows during the above periods and the oscillation occurs due to the resonance of the reactor Lr and stray capacitance Cm.

The waveforms of FIG. 6B appear when the input power source voltage Vin is 450 V, the load is a rated load (100% Load) and the switching frequency is 74.6 kHz (with a period of 13.4 μs). The waveforms of FIG. 6C appear when the input power source voltage Vin is 300V, the load is light (0.01% Load) and the switching frequency is 87.7 kHz (with a period of 11.4 μs). The waveforms of FIG. 6D appear when the input power source voltage Vin is 450 V, the load is light (0.01% Load) and the switching frequency is 139.4 kHz (with a period of 7.17 μs).

During the period when only the excitation current flows through the transformer T2 or when most of the current flowing through the transformer T2 is excitation current with a light load as illustrated in FIGS. 6B to 6D, an oscillating voltage is observed on the voltage waveform VD1 of the diode D1 due to the resonance of the reactor Lr and stray capacitance Cm as does happen in the case of the periods t3 to t4 and t6 to t7 of FIG. 6A.

The waveform of each portion can be compared with the change of the input voltage (Vin=300 V to 450 V) when the rated load (100% Load) is used by comparing the waveforms of FIG. 6A and the waveforms of the FIG. 6B. For the change of the input voltage, the switching frequency is changed by the PFM control. That is, the switching frequency is equal to 43.1 kHz when Vin=300 V in FIG. 6A; the switching frequency is equal to 74.6 kHz when Vin=450 V in FIG. 6B. The switching frequency varies according to the change of the input voltage.

The control circuit 10 makes use of the fact that the frequency of the resonant current flowing through the load is constant to perform a PFM control process in the following manner: the control circuit 10 controls the frequency and changes the on-width to increase or decrease the excitation current that is a circulating current, and changes the voltage amplitude of the current resonant capacitor Cri, so that the output voltage is constant. Accordingly, as the voltage of the input direct-current power source Vin increases, the control circuit 10 raises the switching frequency. It is clear that when the voltage of the input direct-current power source Vin increases, the switching frequency is raised so that the output voltage Vo gets stabilized.

The waveform of each portion can be compared with the change of the input voltage (Vin=300 V to 450 V) when the load is light (0.01% Load) by comparing the waveforms of FIG. 6C and the waveforms of the FIG. 6D. The switching frequency is equal to 87.7 kHz when Vin=300 V in FIG. 6C; the switching frequency is equal to 139.4 kHz when Vin=450 V in FIG. 6D. In this case, it is clear that when the voltage of the input direct-current power source Vin increases, the switching frequency is raised so that the output voltage vo gets stabilized as in the cases of FIGS. 6A and 6B.

Thanks to the comparison of the waveforms of FIG. 6A with the waveforms of FIG. 6C as well as the comparison of the waveforms of FIG. 6B with the waveforms of FIG. 6D, the waveform of each portion can be compared with the change of the load when the input voltages are the same. Since the load is the rated load in the cases of FIGS. 6A and 6B, a resonant current that is equivalent to a rated load current flows as a load current. Since the load is light in the cases of FIGS. 6C and 6D, almost no resonant current flows as a load current and the excitation current is dominant. Therefore, there are almost no periods that are equivalent to the periods t1 to t3 and t4 to t6. The oscillation caused by the resonance of the reactor Lr and stray capacitance Cm occurs substantially over the entire period. The oscillation affects the voltage applied to the diodes D1 and D2 in such a way that the smoothing capacitor Co is charged to the peak. In addition, the switching frequency changes dramatically as the load changes.

In other words, an oscillating voltage occurs due to the stray capacitance Cm and the reactor Lr when the load is light because the unnecessary boosting energy is stored in the reactor Lr. Because of the peak voltage of the oscillating voltage, the smoothing capacitor Co is charged to the peak through the diodes D1 and D2. Moreover, since the rectified voltage is easily peak-charged to a higher voltage due to the oscillating voltage caused by the stray capacitance Cm and reactor Lr when the load is light, the amount fed back by a feedback circuit increases; the control circuit 10 increases the switching frequency to reduce the increase of the output voltage.

Figure 7:
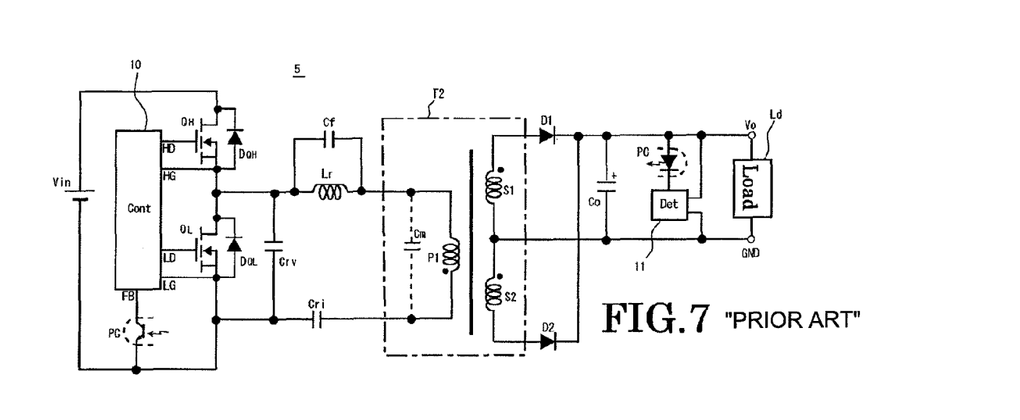
FIG. 7 is a circuit configuration diagram of a resonant switching power supply device according to a prior art disclosed in Patent Document 1.
Figure 8:
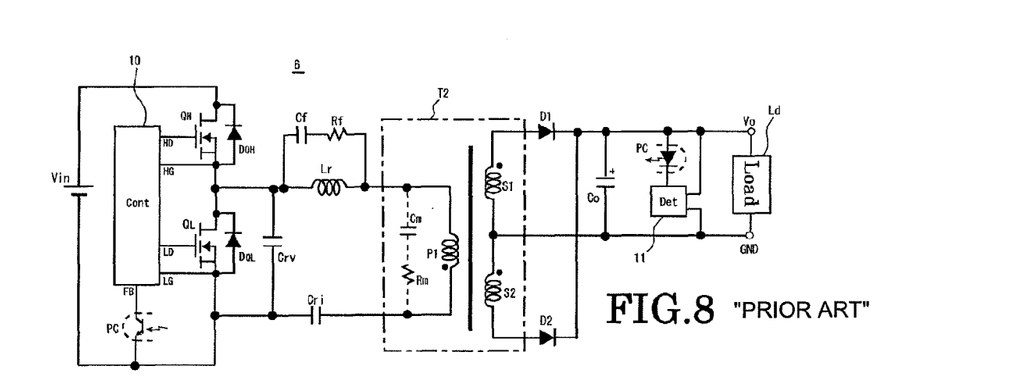
FIG. 8 is a circuit configuration diagram of another resonant switching power supply device according to the prior art disclosed in Patent Document 1.

FIG. 7 shows the circuit configuration of a current resonant DC-DC converter disclosed in Patent Document 1. According to the technique disclosed in Patent Document 1, it is possible to prevent the increase of the switching frequency when the load is light. As shown in FIG. 7, the current resonant DC-DC converter disclosed in Patent Document 1 has a capacitor Cf that is connected in parallel to the reactor Lr to prevent unnecessary boosting energy from being stored in the reactor Lr due to the charge current of the stray capacitance Cm. The capacitor Cf serves as a bypass to keep the current of the stray capacitance Cm from flowing through the reactor Lr and prevent the boosting energy from being stored in the reactor Lr. FIG. 8 shows the circuit configuration of another current resonant DC-DC converter disclosed in Patent Document 1: the stray capacitance Cm and a stray resistance Rm are taken into account and a series circuit of the capacitor Cf and a resistor Rf is connected in parallel to the reactor Lr.

FIGS. 9A to 9D show the waveform of each portion corresponding to that in FIGS. 6A to 6D, which has improved thanks to the adoption of the circuit configurations of FIGS. 7 and 8. When FIGS. 9C and 9D, in which the load is light (0.01% Load), are compared with FIGS. 6C and 6D, it is clear from the waveforms shown in FIGS. 9C and 9D that an oscillating voltage caused by a resonant circuit of the stray capacitance Cm and reactor Lr is not superimposed on the voltage VD1 of the diode D1. Therefore, according to the current resonant DC-DC converter disclosed in Patent Document 1, the switching frequency does not increase when the load is light.

Figure 9:
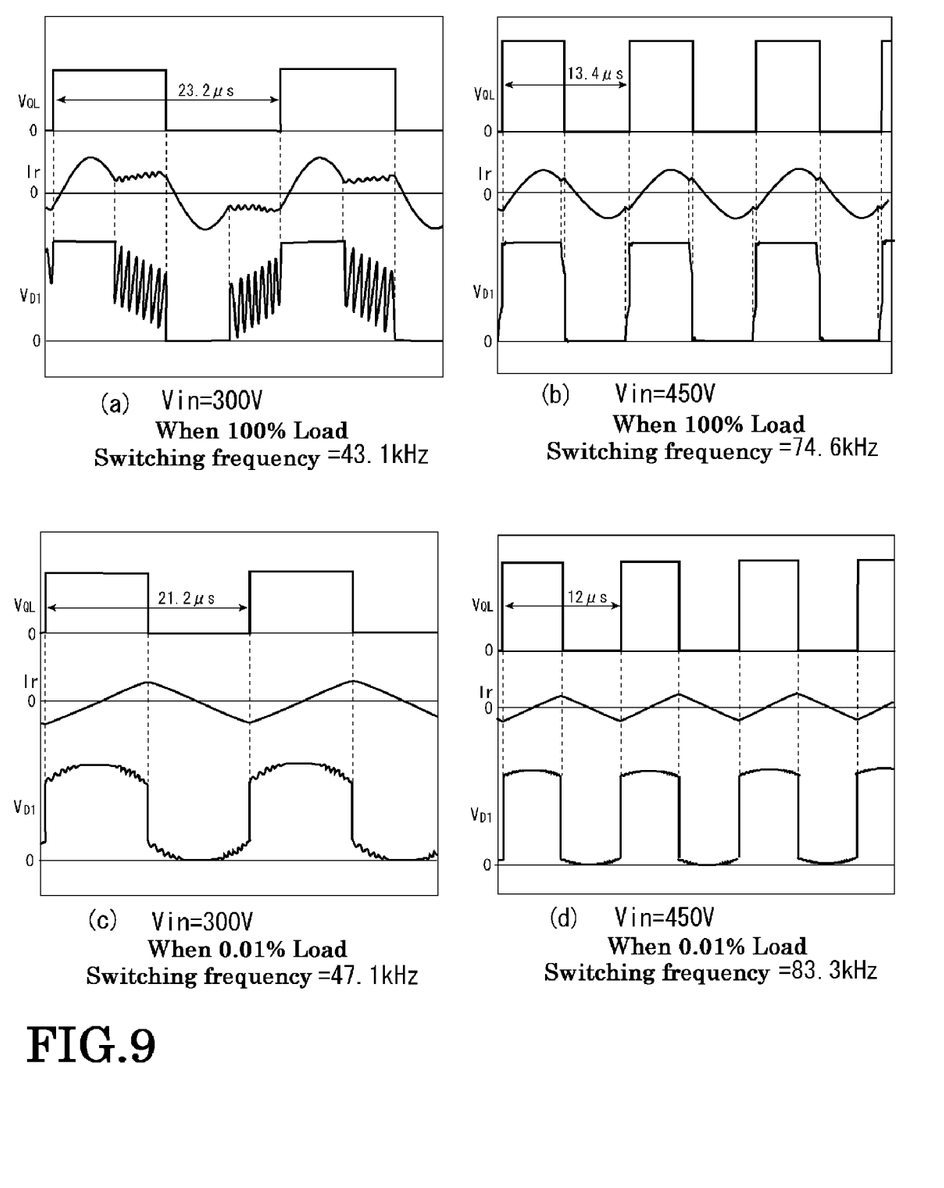
FIGS. 9A to 9D are operational sequence diagrams of the resonant switching power supply devices according to the present invention and prior art of Patent Document 1.

When the waveforms with 100% Load of FIG. 9A are actually compared with the waveforms with 0.01% Load of FIG. 9C, there is almost no change since the switching frequencies are 43.1 kHz and 47.1 kHz, respectively. As for the waveforms with 100% Load and no capacitor Cf of FIG. 6A and the waveforms with 0.01% Load of FIG. 6C, the switching frequency dramatically changes from 43.1 kHz to 87.7 kHz as described above.

When the waveforms with 100% Load of FIG. 9B are actually compared with the waveforms with 0.01% Load of FIG. 9D, the amount of change is small even though the switching frequency changes from 74.6 kHz to 83.3 kHz. As for the waveforms with 100% Load and no capacitor Cf of FIG. 6B and the waveforms with 0.01% Load of FIG. 6D, the switching frequency dramatically changes from 74.6 kHz to 139.4 kHz as described above.

Figure 10:
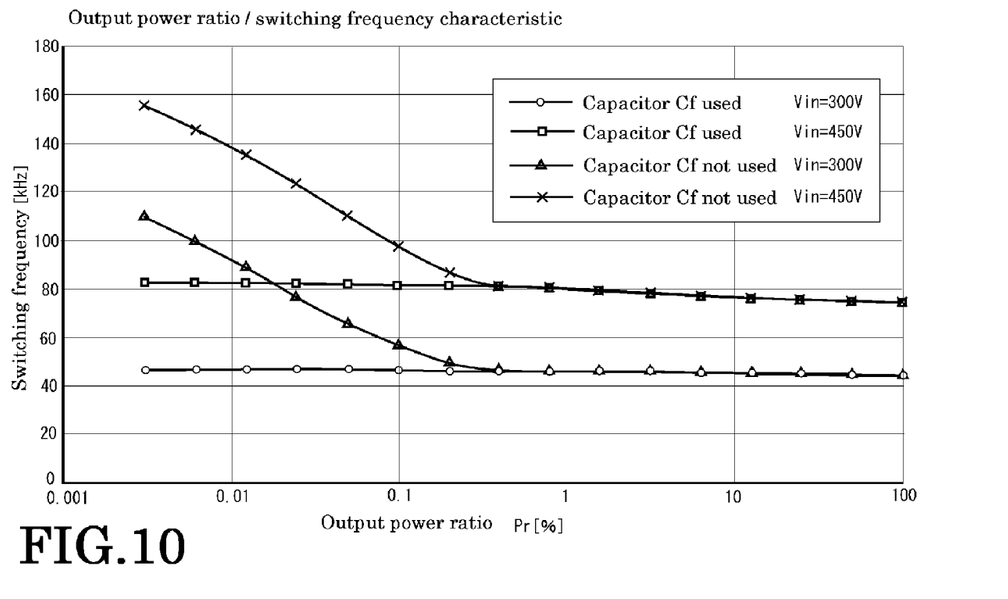
FIG. 10 is a diagram for explaining an output power ratio/switching frequency characteristic of the resonant switching power supply devices according to the present invention and prior art of Patent Document 1.

FIG. 10 shows how an output power ratio/switching frequency characteristic changes depending on whether there is the capacitor Cf or not. If there is no capacitor Cf, the switching frequency increases as the output power ratio decreases when the voltage of the input direct-current power source Vin is under a predetermined condition (a constant voltage of Vin=300 V or 450 V). If there is the capacitor Cf, the switching frequency is substantially constant even as the output power ratio changes when the voltage of the input direct-current power source Vin is under a predetermined condition (a constant voltage of Vin=300 V or 450 V). If there is no capacitor Cf, the switching frequency increases as the output power ratio decreases, particularly within a range where the output power ratio is about 0.3% or less. When there is no load, the switching frequency substantially doubles, a significant increase compared with when the rated load is used.

As described above, the technique disclosed in Patent Document 1 can solve the problem of the increase in switching frequency when the load is light. However, as described above, the current resonant reactor needs to be prepared as a separate, individual component besides the transformer. Therefore, it is impossible to reduce the number of components, thereby making the device larger and increasing the costs.

SUMMARY OF THE INVENTION

The object of the present invention is, in view of the above problems, to provide a technique of making the leakage inductance of the leakage transformer serve as a current resonant reactor and connecting a capacitor in parallel to the current resonant reactor realized by the use of the leakage inductance and therefore to make the current resonant switching power supply device smaller as well as to reduce costs.

According to the present invention, a resonant switching power supply device that is equipped with a plurality of switching elements connected in series to an input direct-current power source, a transformer having a secondary winding and a first primary winding, a resonant circuit where the first primary winding and a current resonant capacitor are connected in series and which is connected in parallel to any one of the switching elements, and a rectifying circuit connected to the secondary winding to obtain an output voltage and controls a switching frequency of the switching elements so that the output voltage is brought to a predetermined target value, wherein the transformer is equipped with a second primary winding coupled to the first primary winding, one terminal of the second primary winding is connected to one or the other terminal of the first primary winding, and the other terminal is open.

Moreover, according to the present invention, the transformer of the resonant switching power supply device may be a leakage transformer.

Furthermore, according to the present invention, one terminal of the second primary winding of the resonant switching power supply device may be connected to one or the other terminal of the first primary winding through a capacitor.

Furthermore, according to the present invention, one terminal of the second primary winding of the resonant switching power supply device may be connected to one or the other terminal of the first primary winding through a resistor.

Furthermore, according to the present invention, one terminal of the second primary winding of the resonant switching power supply device may be connected to one or the other terminal of the first primary winding through a series circuit of a capacitor and resistor. Furthermore, according to the present invention, the first primary winding and second primary winding of the resonant switching power supply device may be closely coupled by bifilar winding.

According to the present invention, it is possible to provide a technique of making the leakage inductance of the leakage transformer serve as a current resonant reactor and connecting a capacitor in parallel to the current resonant reactor realized by the use of the leakage inductance and therefore to make the current resonant switching power supply device smaller as well as to reduce costs.

DETAILED DESCRIPTION OF THE PREFERRED EMBODIMENTS

The following describes in detail embodiments of the present invention with reference to the accompanying drawings.

(First Embodiment)

Figure 1:
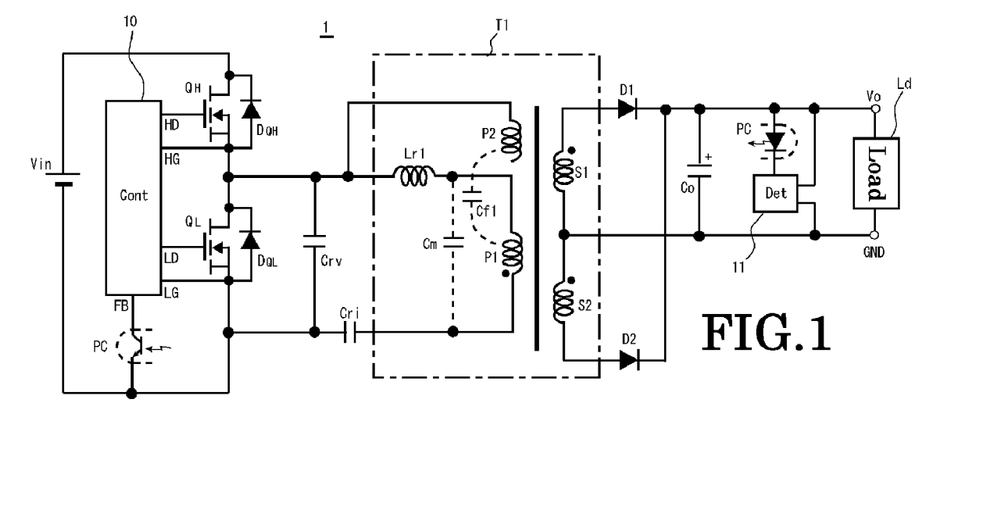
FIG. 1 is a circuit configuration diagram of a resonant switching power supply device according to a first embodiment of the present invention.

FIG. 1 is a diagram showing the circuit configuration of a resonant switching power supply device 1 according to a first embodiment of the present invention.

In the resonant switching power supply device 1 shown in FIG. 1, the reference symbol Vin denotes an input direct-current power source, Cri a current resonant capacitor, Co a smoothing capacitor, Crv a voltage resonant capacitor, QH a high-side switching element that is a N-channel MOSFET, QL a low-side switching element that is a N-channel MOSFET, DQH, DQL, D1 and D2 diodes, T1 a transformer, Lr1 the primary leakage inductance of the transformer T1, P1 and P2 primary windings of the transformer T1, S1 and S2 secondary windings of the transformer T1, and Ld a load. The reference symbol Cf1 represents a new stray capacitance generated between the primary windings P1 and P2 thanks to the addition of the primary winding P2 of the transformer T1. As for the reference symbol Cm, the stray capacitances between the primary winding P1 and secondary windings S1 and S2 of the transformer T1, the electrodes of the diodes D1 and D2 and other parts are converted into the primary side of the transformer T1 and represented as one capacitor Cm. The reference numeral 11 represents a voltage detector that detects an output voltage. The reference symbol PC represents a photocoupler that feeds signals that are proportional to the output voltage detected by the voltage detector 11 back to the primary side. The reference numeral 10 represents a control circuit that brings the output voltage to a predetermined value on the basis of the feedback signals associated with the output voltage that are input to an input terminal FB through the photocoupler PC.

The resonant switching power supply device 1 has the configuration of a half bridge circuit. The drain terminal of the switching element QH is connected to the positive terminal of the input direct-current power source Vin. The source terminal of the switching element QL is connected to the negative terminal of the input direct-current power source Vin. The source terminal of the switching element QH is connected to the drain terminal of the switching element QL.

The diode DQH is connected between the drain and source of the switching element QH, and the diode DQL between the drain and source of the switching element QL. The diodes DQH and DQL are diodes built into the switching elements QH and QL or external diodes connected to the switching elements QH and QL. The diodes DQH and DQL are connected in the direction opposite to the flow of current through the switching elements QH and QL (anti-parallel connection).

The voltage resonant capacitor Crv is connected in parallel to the drain terminal and source terminal of the switching element QL; a series circuit in which the primary winding P1 of the transformer T1 and the current resonant capacitor Cri are connected in series is connected in parallel. That is, one terminal of the voltage resonant capacitor Crv is connected to the drain terminal of the switching element QL. The other terminal of the voltage resonant capacitor Crv is connected to the source terminal of the switching element QL. One terminal of the primary winding P1 is connected to a connection point where the drain terminal of the switching element QL and one terminal of the voltage resonant capacitor Crv are connected. The other terminal of the primary winding P1 is connected to one terminal of the current resonant capacitor Cri. The other terminal of the current resonant capacitor Cri is connected to a connection point where the source terminal of the switching element QL and the other terminal of the voltage resonant capacitor Crv are connected.

To achieve the function of a current resonant reactor, The primary leakage inductance Lr1 is set at a predetermined value by the transformer T1 that is formed as a leakage transformer. One terminal of the newly added primary winding P2 is connected to a connection point where the source terminal of the switching element QH, the drain terminal of the switching element QL, one terminal of the voltage resonant capacitor Crv and one terminal of the primary winding P1 of the transformer T1 are connected, while the other terminal is open. The primary windings P1 and P2 are closely coupled to form a stray capacitance Cf1 of a predetermined value between the primary windings P1 and P2 of the transformer T1. According to the present embodiment, the primary windings P1 and P2 are closely coupled by bifilar winding.

The stray capacitance Cf1 can be set in a similar way to that of Patent Document 1. That is, in order to prevent the charging and discharging energy of the stray capacitance Cm from being stored in the primary leakage inductance Lr1 acting as a current resonant reactor, the stray capacitance Cf1 can be so designed as to keep a current caused by the charging and discharging of the stray capacitance Cm from flowing through the primary leakage inductance Lr1. The value of the stray capacitance Cf1 at the time is calculated from the excitation inductance Lp of the transformer T1, the primary leakage inductance Lr1 and the stray capacitance Cm. More specifically, in a similar way to the "Formula 2" in Patent Document 1, the value of the stray capacitance Cf1 can be set with the formula Cf1=(Lp/Lr1)·Cm so that the impedance between both ends of the primary leakage inductance Lr is equal to the impedance between both ends of the excitation inductance Lp.

Incidentally, the following change may be made so that one terminal of the primary winding P2 is connected to a connection point where one terminal of the current resonant capacitor Cri and one terminal of the primary winding P1 of the transformer T1 are connected: the other terminal of the current resonant capacitor Cri is connected to a connection point where the source terminal of the switching element QH, the drain terminal of the switching element QL, and one terminal of the voltage resonant capacitor Crv are connected; one terminal of the current resonant capacitor Cri is connected to one terminal of the primary winding P1 of the transformer T1; and the other terminal of the primary winding P1 of the transformer T1 is connected to a connection point where the source terminal of the switching element QL and the other terminal of the voltage resonant capacitor Crv are connected. Moreover, in terms of an equivalent circuit, the primary leakage inductance Lr1 can also be considered to be at the side where the other terminal of the primary winding P1 of the transformer T1 exists. Therefore, one terminal of the primary winding P2 may be connected to a connection point where one terminal of the current resonant capacitor Cri and the other terminal of the primary winding P1 of the transformer T1 are connected (i.e. one terminal of the primary leakage inductance Lr1 may be connected to one or the other terminal of the primary winding P1).

The polarity of the voltage that occurs at each of the windings P1, S1 and S2 of the transformer T1 is indicated by dot (•). One terminal of the primary winding P1 (at the side opposite to •) of the transformer T1 is connected to a connection point where the source terminal of the switching element QH, the drain terminal of the switching element QL, one terminal of the voltage resonant capacitor Crv and one terminal of the primary winding P2 are connected, while the other terminal (at the •-side) is connected to one terminal of the current resonant capacitor Cri. The primary winding P2 is provided for generating the stray capacitance Cf1. The voltage that occurs at the primary winding P2 is not used. Therefore, it is not necessary to set the polarity of the voltage.

The anode terminal of the diode D1 is connected to one terminal (at the •-side) of the secondary winding S1 of the transformer T1. The cathode terminal of the diode D1 is connected to one terminal (positive-side terminal) of the smoothing capacitor Co, the cathode terminal of the diode D2 and the output terminal Vo. The other terminal of the secondary winding S1 of the transformer T1 and one terminal (at the •-side) of the secondary winding S2 of the transformer T1 are connected in series; the connection point is connected to the other terminal (negative-side terminal) of the smoothing capacitor Co and an output GND terminal. The other terminal of the secondary winding S2 of the transfer T1 is connected to the anode of the diode D2. The cathode terminal of the diode D2 is connected to a connection point where one terminal (positive-side terminal) of the smoothing capacitor Co, the cathode terminal of the diode D1 and the output terminal Vo are connected together. The load Ld is connected to both ends of the smoothing capacitor Co.

The feedback signals of the output voltage are input to the input terminal FB of the control circuit 10. The control circuit 10 supplies gate signals to the gate terminal of the switching element QL through output terminals LD and LG on the basis of the feedback signals as well as to the gate terminal of the switching element QH through output terminals HD and HG.

The control circuit 10 performs a PFM control process by alternately turning the switching elements QL and QH on and off on the basis of the feedback signals, setting the on-duty of the switching elements QL and QH at about 50%, and changing the frequency of the switching elements QL and QH so that the output voltage vo of the smoothing capacitance Co becomes constant. Incidentally, there is dead time to prevent both the switching elements QL and QH from being turned on at the same time.

Figure 2:
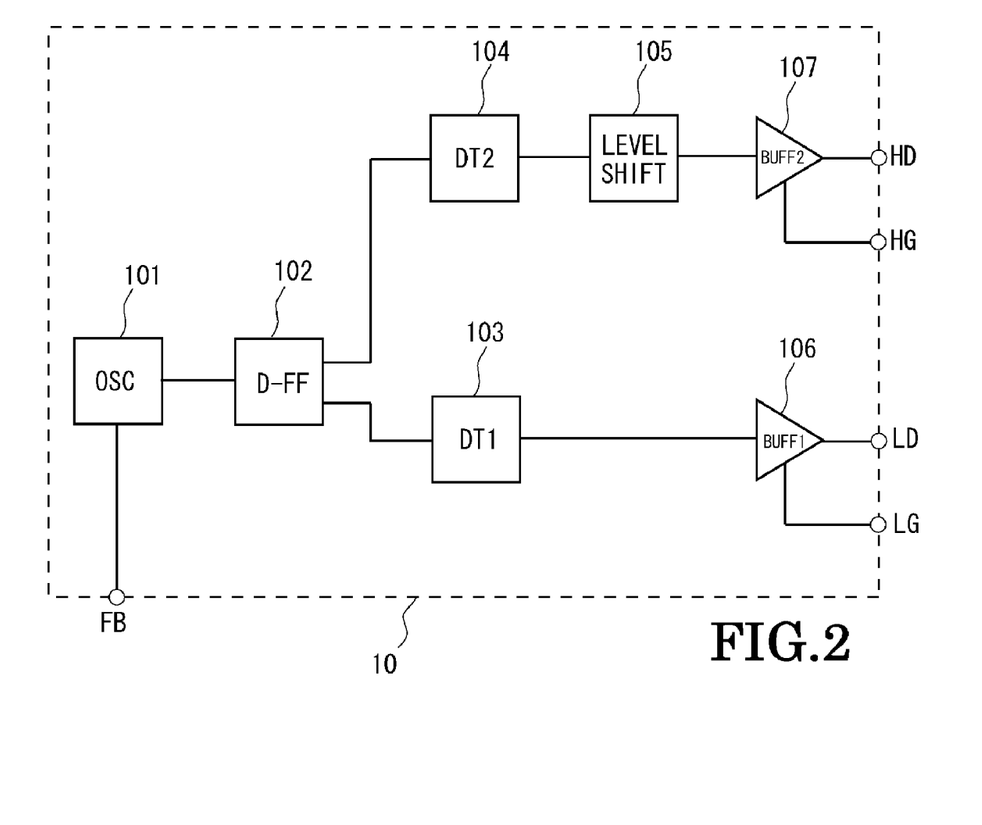
FIG. 2 is a detailed configuration diagram of a control circuit in a resonant switching power supply device according to an embodiment of the present invention.

FIG. 2 shows in detail an example of the configuration of the control circuit 10. The control circuit 10 shown in FIG. 2 includes an oscillator (OSC) 101, a D-FF circuit 102, a dead time generation circuit (DT1) 103, a dead time generation circuit (DT2) 104, a level shift circuit 105, a buffer circuit (BUFF1) 106, and a buffer circuit (BUFF2) 107.

After the feedback signals of the output voltage from the photocoupler PC are input to the oscillator 101 through the input terminal FB, the oscillator 101 generates pulse signals of a frequency that is based on the feedback signals and then outputs the pulse signals to the D-FF circuit 102. As the feedback signals input from the input terminal FB increase, the oscillator 101 outputs pulse signals of a higher frequency. After the pulse signals are input from the oscillator 101, the D-FF circuit 102 generates two types of signals, each with 50% duty, to alternately switch on and off and then outputs the signals to the dead time generation circuits 103 and 104.

One type of signals turns out to be gate drive signals, which are supplied to the low-side switching element QL through the buffer circuit 106. The gate drive signals are output from the terminals LD-LG.

The other type turns out to be gate drive signals, which are supplied to the high-side switching element QH through the dead time generation circuit 104, the level shift circuit 105 (which is a circuit that shifts the level of the gate drive signals to a high voltage level of the high side relative to a voltage level of the low side) and the buffer circuit 107. The gate drive signals are output from the terminals HD-HG. Thanks to the dead time generation circuits 103 and 104, the high-side switching element QH and the low-side switching element QL are alternately switched on and off with the dead time.

In the resonant switching power supply device 1 having the above configuration, the stray capacitance Cf1 of a predetermined value is formed between the primary windings P1 and P2; one terminal of the stray capacitance Cf1 is connected to one terminal of the primary leakage inductance Lr1 (which is equivalent to one terminal of the reactor Lr shown in FIG. 7), while the other terminal of the stray capacitance Cf1 is connected to the other terminal of the primary leakage inductance Lr1 (which is equivalent to the other terminal of the reactor Lr shown in FIG. 7). Thus, the circuit configuration of the resonant switching power supply device 5 shown in FIG. 7 is realized in terms of an equivalent circuit.

According to the present embodiment, the configuration of the transformer allows the reactor Lr and capacitor Cf shown in FIG. 7 to be formed as one component because of the primary leakage inductance Lr1 of the transformer T1 and the stray capacitance Cf1. The reactor Lr1 and the stray capacitance Cf1 are connected in a similar way to that of the conventional technique disclosed in Patent Document 1 in terms of an equivalent circuit. Therefore, it is possible to reduce the oscillating voltage caused by the primary leakage inductance Lr1 and the stray capacitance Cm as well as to reduce the significant increase of the switching frequency when the load is light. As in the case of the type of DC-DC converter that uses a conventional leakage transformer, it is possible to make the device smaller and reduce costs as well as to avoid making the device larger and an increase in costs.

(Second Embodiment)

Figure 3:
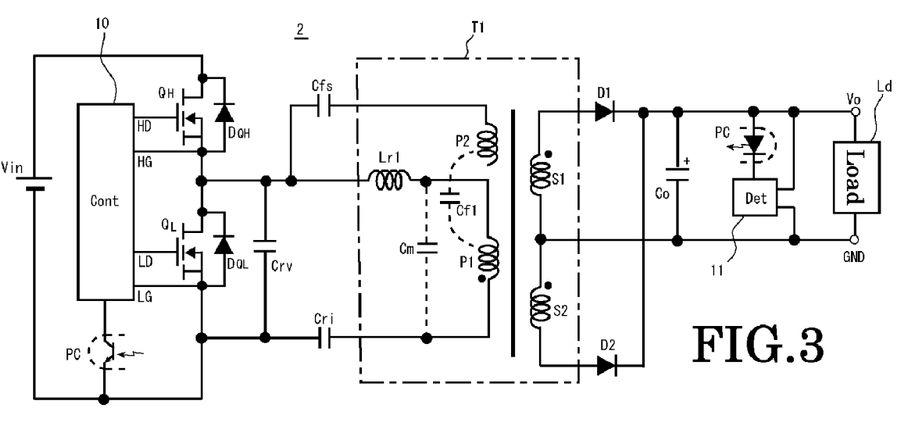
FIG. 3 is a circuit configuration diagram of a resonant switching power supply device according to a second embodiment of the present invention.

FIG. 3 is a diagram showing the circuit configuration of a resonant switching power supply device 2 according to a second embodiment of the present invention.

The resonant switching power supply device 2 shown in FIG. 3 is different from the resonant switching power supply device 1 of the first embodiment shown in FIG. 1 in that one terminal of a newly provided primary winding P2 of the transformer T1 is connected to a connection point where the source terminal of the switching element QH, the drain terminal of the switching element QL, one terminal of the voltage resonant capacitor Crv and one terminal of the primary winding P1 are connected through a capacitor Cfs.

Incidentally, in this case, as in the case of the first embodiment, the following change may be made so that one terminal of the primary winding P2 is connected to a connection point where one terminal of the current resonant capacitor Cri and one terminal of the primary winding P1 of the transformer T1 are connected through the capacitor Cfs: the other terminal of the current resonant capacitor Cri is connected to a connection point where the source terminal of the switching element QH, the drain terminal of the switching element QL, and one terminal of the voltage resonant capacitor Crv are connected; one terminal of the current resonant capacitor Cri is connected to one terminal of the primary winding P1 of the transformer T1; and the other terminal of the primary winding P1 of the transformer T1 is connected to a connection point where the source terminal of the switching element QL and the other terminal of the voltage resonant capacitor Crv are connected. Moreover, in terms of an equivalent circuit, the primary leakage inductance Lr1 can also be considered to be at the side where the other terminal of the primary winding P1 of the transformer T1 exists. Therefore, one terminal of the primary winding P2 may be connected to one or the other terminal of the primary winding P1 through the capacitor Cfs (i.e. one terminal of the primary leakage inductance Lr1 may be connected to one or the other terminal of the primary winding P1 through the capacitor Cfs).

The value of the stray capacitance Cf1 formed by the primary windings P1 and P2 varies according to how the primary windings P1 and P2 are wound. In some cases, it is difficult to generate an arbitrary value. However, according to the present invention, it is possible to easily adjust the capacitance of the capacitors connected in parallel to the leakage inductance Lr1 (i.e. the series capacitance of the stray capacitance Cf1 and capacitor Cfs) to the most appropriate value thanks to the capacitor Cfs connected in series to the primary winding P2. Accordingly, even if the primary leakage inductance Lr1 is used as current resonant inductance, it is possible to easily reduce the significant increase of the switching frequency when the load is light.

(Third Embodiment)

Figure 4:
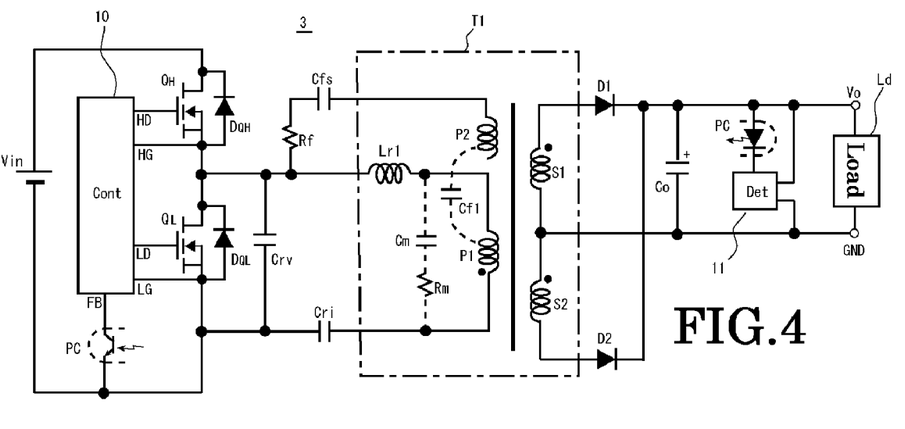
FIG. 4 is a circuit configuration diagram of a resonant switching power supply device according to a third embodiment of the present invention.

FIG. 4 is a diagram showing the circuit configuration of a resonant switching power supply device 3 according to a third embodiment of the present invention.

The resonant switching power supply device 3 shown in FIG. 4 is different from the resonant switching power supply device 2 of the second embodiment shown in FIG. 3 in that one terminal of a newly provided primary winding P2 of the transformer T1 is connected to a connection point where the source terminal of the switching element QH, the drain terminal of the switching element QL, one terminal of the voltage resonant capacitor Crv and one terminal of the primary winding P1 are connected through a series circuit of a capacitor Cfs and resistor Rf.

In this case, the value of the "series capacitance of the stray capacitance Cf1 and capacitor Cfs" and the value of the resistor Rf are each set in a similar way to those of Patent Document 1. That is, in a similar way to the "Formula 3" in Patent Document 1, the value of the "series capacitance of the stray capacitance Cf1 and capacitor Cfs" and the value of the resistor Rf can be set with the formulas "Series capacitance of stray capacitance Cf1 and capacitor Cfs"=(Lp/Lr1)·Cm and Rf=(Lr1/Lp)·Rm so that the impedance between both ends of the primary leakage inductance Lr1 is equal to the impedance between both ends of the excitation inductance Lp (not shown). Moreover, regardless of the value of the stray resistance Rm, the value of the resistor Rf can be raised to reduce the oscillating voltage caused by the primary leakage inductance Lr1 of the transformer T1 and the stray capacitance Cm. Therefore, the value of the resistor Rf may not be equal to the above.

According to the present embodiment, in addition to the effect of the second embodiment, the stray resistance Rm connected in series to the stray capacitance is also taken into account and it is possible to adjust the capacitance to the most appropriate value. Accordingly, even if the primary leakage inductance Lr1 is used as current resonant inductance, it is possible to easily reduce the significant increase of the switching frequency when the load is light.

Incidentally, in this case, as in the case of the first embodiment, the following change may be made so that one terminal of the primary winding P2 is connected to a connection point where one terminal of the current resonant capacitor Cri and one terminal of the primary winding P1 of the transformer T1 are connected through a series circuit of the capacitor Cfs and resistor Rf: the other terminal of the current resonant capacitor Cri is connected to a connection point where the source terminal of the switching element QH, the drain terminal of the switching element QL, and one terminal of the voltage resonant capacitor Crv are connected; one terminal of the current resonant capacitor Cri is connected to one terminal of the primary winding P1 of the transformer T1; and the other terminal of the primary winding P1 of the transformer T1 is connected to a connection point where the source terminal of the switching element QL and the other terminal of the voltage resonant capacitor Crv are connected. Moreover, in terms of an equivalent circuit, the primary leakage inductance Lr1 can also be considered to be at the side where the other terminal of the primary winding P1 of the transformer T1 exists. Therefore, one terminal of the primary winding P2 may be connected to one or the other terminal of the primary winding P1 through the series circuit of the capacitor Cfs and resistor Rf (i.e. one terminal of the primary leakage inductance Lr1 may be connected to one or the other terminal of the primary winding P1 through the series circuit of the capacitor Cfs and resistor Rf).

Moreover, without the capacitor Cfs, one terminal of the primary winding P2 may be connected to one or the other terminal of the primary winding P1 only through the resistor Rf (i.e. one terminal of the primary leakage inductance Lr1 may be connected to one or the other terminal of the primary winding P1 only through the resistor Rf).

The above has described in detail the present invention with reference to the embodiments. Needless to say, the present invention is not limited to the above embodiments; modifications may be made without departing from the scope of the present invention. For example, while an example of the half bridge type is used in describing the above embodiments, the present invention can be applied to a full bridge type without change. Moreover, while the resonant circuit is connected in parallel to the low-side switching element according to the above embodiments, the resonant circuit may be connected in parallel to the high-side switching element.

What is claimed is:

1. A resonant switching power supply device that is equipped with a plurality of switching elements connected in series to an input direct-current power source, a transformer having a secondary winding and a first primary winding, a resonant circuit where the first primary winding and a current resonant capacitor are connected in series and which is connected in parallel to any one of the switching elements, and a rectifying circuit connected to the secondary winding to obtain an output voltage and controls a switching frequency of the switching elements so that the output voltage is brought to a predetermined target value, wherein the transformer is equipped with a second primary winding coupled to the first primary winding, one terminal of the second primary winding is connected to one or the other terminal of the first primary winding, and the other terminal is always open at any time, wherein a stray capacitance is formed between the first primary winding and the second primary winding.

2. The resonant switching power supply device according to claim 1, wherein the transformer is a leakage transformer.

3. The resonant switching power supply device according to claim 1, wherein one terminal of the second primary winding is connected to one or the other terminal of the first primary winding through a capacitor.

4. The resonant switching power supply device according to claim 2, wherein one terminal of the second primary winding is connected to one or the other terminal of the first primary winding through a capacitor.

5. The resonant switching power supply device according to claim 1, wherein one terminal of the second primary winding is connected to one or the other terminal of the first primary winding through a resistor.

6. The resonant switching power supply device according to claim 2, wherein one terminal of the second primary winding is connected to one or the other terminal of the first primary winding through a resistor.

7. The resonant switching power supply device according to claim 1, wherein one terminal of the second primary winding is connected to one or the other terminal of the first primary winding through a series circuit of a capacitor and resistor.

8. The resonant switching power supply device according to claim 2, wherein one terminal of the second primary winding is connected to one or the other terminal of the first primary winding through a series circuit of a capacitor and resistor.

9. The resonant switching power supply device according to claim 1, wherein the first primary winding and the second primary winding are closely coupled by bifilar winding.

10. The resonant switching power supply device according to claim 2, wherein the first primary winding and the second primary winding are closely coupled by bifilar winding.

11. The resonant switching power supply device according to claim 3, wherein the first primary winding and the second primary winding are closely coupled by bifilar winding.

12. The resonant switching power supply device according to claim 4, wherein the first primary winding and the second primary winding are closely coupled by bifilar winding.

13. The resonant switching power supply device according to claim 5, wherein the first primary winding and the second primary winding are closely coupled by bifilar winding.

14. The resonant switching power supply device according to claim 6, wherein the first primary winding and the second primary winding are closely coupled by bifilar winding.

15. The resonant switching power supply device according to claim 7, wherein the first primary winding and the second primary winding are closely coupled by bifilar winding.

16. The resonant switching power supply device according to claim 8, wherein the first primary winding and the second primary winding are closely coupled by bifilar winding.

17. The resonant switching power supply device according to claim 1, wherein the second primary winding is coupled to the first primary winding in order to flow current flowing in stray capacitance formed between the first primary winding and the second primary winding to one terminal or the other terminal of the first primary winding.

* * * * *